(12) United States Patent
Lamprey, Jr.

(10) Patent No.: US 9,174,139 B2
(45) Date of Patent: Nov. 3, 2015

(54) NOISE-MAKING ASSEMBLY

(71) Applicant: Charles W Lamprey, Jr., San Jose, CA (US)

(72) Inventor: Charles W Lamprey, Jr., San Jose, CA (US)

(*) Notice: Subject to any disclaimer, the term of this patent is extended or adjusted under 35 U.S.C. 154(b) by 0 days.

(21) Appl. No.: 14/286,493

(22) Filed: May 23, 2014

(65) Prior Publication Data
US 2015/0050861 A1 Feb. 19, 2015

Related U.S. Application Data

(60) Provisional application No. 61/866,143, filed on Aug. 15, 2013.

(51) Int. Cl.
A63H 5/00 (2006.01)
A01K 15/02 (2006.01)

(52) U.S. Cl.
CPC .............. A63H 5/00 (2013.01); A01K 15/025 (2013.01)

(58) Field of Classification Search
USPC ............... 446/297, 397, 404, 411, 415, 422; D21/405
See application file for complete search history.

(56) References Cited

U.S. PATENT DOCUMENTS

| 1,741,530 | A | | 11/1923 | Mayer | |
|---|---|---|---|---|---|
| 1,509,956 | A | * | 9/1924 | Kipp | 446/418 |
| 3,621,606 | A | * | 11/1971 | Potrzuski | 446/297 |
| 3,900,992 | A | * | 8/1975 | Klamer | 446/330 |
| 3,990,177 | A | * | 11/1976 | Daraux | 446/418 |
| 4,000,579 | A | * | 1/1977 | Gornall | 446/297 |
| 4,531,924 | A | * | 7/1985 | Samson | 446/213 |
| 5,106,332 | A | * | 4/1992 | Segan et al. | 446/415 |
| 5,611,297 | A | | 3/1997 | Veloce | |
| 5,830,037 | A | * | 11/1998 | Mastandrea, Jr. | 446/415 |
| D405,479 | S | * | 2/1999 | Loob | D21/405 |
| 5,873,328 | A | * | 2/1999 | Campbell | 119/798 |
| 6,090,420 | A | * | 7/2000 | Coleman et al. | 426/104 |
| 6,467,437 | B2 | * | 10/2002 | Donovan et al. | 119/798 |
| 6,494,764 | B1 | * | 12/2002 | Tom | 446/397 |
| 8,397,672 | B2 | | 3/2013 | Zine | |

* cited by examiner

Primary Examiner — Kurt Fernstrom
(74) Attorney, Agent, or Firm — Kali Law Group, P.C.

(57) ABSTRACT

Noise-making assemblies are presented including: a self-recovering stretchable element; and at least one noise-making element mechanically coupled with and along the self-recovering stretchable element at a number of attachment points, where the at least one noise-making element forms slack portions between the number of attachment points when the self-recovering stretchable element is in a relaxed position, where the slack portions are flattened when the self-recovering stretchable element is in an extended position, and where when the self-recovering stretchable element extends from the relaxed position to the extended position, the at least one noise-making elements emits a noise.

18 Claims, 8 Drawing Sheets

NOISE-MAKING ASSEMBLY

BACKGROUND

Many domestic dogs and cats enjoy interacting with their owners and with other dogs and cats by grasping a play object in their mouth or in one or more of their paws while the owner or other dog or cat grasps the same play object. As a result, a "tug of war" play session may ensue. In some examples, a cat may "bat" at an object hanging from a string or other tether-like structure and grasp the object with one or more claws and pull on it. One such play object is disclosed in U.S. Pat. No. 5,611,297. In addition to pet/owner play, a baby or toddler may grasp and pull on a noisemaking device affixed to a crib, gym structure, or other stable mount apparatus. For all of these examples, some commercially available dog, cat, and baby toys include noisemaking elements that activate when the object is grasped, squeezed, shaken and/or tugged in order to pique an animal's or a child's interest and to further excite them during play with the object. Such noisemaking elements typically include: rattlers, bells, pneumatically operated squeakers, electronically generated noisemaking units, and "crackling" elements.

Crackling elements provide a crackling, crinkling or rustling sound and a small vibration when deformed, such as when bent, straightened or compressed. Examples of objects and materials that are able to produce this effect include: plant-based paper, acetate paper, aluminum foil, polypropylene, MYLAR® (polyethylene terephthalate film) and various other polymers. Crackling elements have been used in pet toys for some time, including the above referenced U.S. Pat. No. 5,611,297 as well as U.S. Pat. No. 8,397,672. In the U.S. Pat. No. 8,397,672, crinkling elements are "sandwiched" in a plush fabric and serve to enhance a cat's sense of hunting as the cat attempts to walk on the fabric. In the U.S. Pat. No. 5,611,297, crinkle elements are attached on a surfaces contacted by the pet and are designed to emit noises when struck by a pet. However, none of these conventional solutions provide a manner in which active tugging play may be achieved that results in crackling. As such, noise-making assemblies are provided herein.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

As such, noise-making assemblies are presented including: a self-recovering stretchable element; and at least one noise-making element mechanically coupled with and along the self-recovering stretchable element at a number of attachment points, where the at least one noise-making element forms slack portions between the number of attachment points when the self-recovering stretchable element is in a relaxed position, where the slack portions are flattened when the self-recovering stretchable element is in an extended position, and where when the self-recovering stretchable element extends from the relaxed position to the extended position, the at least one noise-making elements emits a noise. In some embodiments, noise-making assemblies further include at least one travel limiting elements attached along each end of the self-recovering stretchable element for limiting the extended position of the self-recovering stretchable element. In some embodiments, the at least one noise-making element is manufactured from a material selected from the group consisting of: a plant-based paper, an acetate paper, a metal foil, a polypropylene compound, a polyethylene terephthalate compound, and a semi-rigid polymer. In some embodiments, the at least one noise-making element is constructed in a manner such as: a single layer construction, a multi-layered construction, a twisted construction, a laminated construction, and a woven construction. In some embodiments, noise-making assemblies further include the self-recovering stretchable element is manufactured from a material selected from the group consisting of: a stretchable fabric, an elastic polymer, a rubber compound, and semi-elastic polymer, a stretchable weave, and a spring coil. In some embodiments, the number of attachment points are made using a process selected from the group consisting of: a stitching, a knotting, a weaving, a gluing, a laser welding, a heat welding, an ultrasonic welding, and a stapling. In some embodiments, noise-making assemblies further include at least one pull member attached along an end of the self-recovering stretchable element.

In other embodiments, noise-making toys are presented including: a toy body; at least one extendable element connected with the toy body; and at least one noise-making assembly enclosed within the at least one extendable element, where the at least one noise-making assembly includes, a self-recovering stretchable element attached along one end of the at least one extendable element and the toy body, and at least one noise-making element mechanically coupled with and along the self-recovering stretchable element at a number of attachment points, where the at least one noise-making element forms slack portions between the number of attachment points when the self-recovering stretchable element is in a relaxed position, where the slack portions are flattened when the self-recovering stretchable element is in an extended position, and where when the self-recovering stretchable element extends from the relaxed position to the extended position, the at least one noise-making elements emits a noise. In some embodiments, noise-making toys further include at least one travel limiting elements attached along each end of the self-recovering stretchable element for limiting the extended position of the self-recovering stretchable element.

In other embodiments, noise-making toys are presented including: a toy body; and at least one noise-making assembly enclosed within the toy body, where the at least one noise-making assembly includes, a self-recovering stretchable element, and at least one noise-making element mechanically coupled with the self-recovering stretchable element at a number of attachment points, where the at least one noise-making element is a tubular configuration that surrounds the self-recovering stretchable element, where the at least one noise-making element is at least partially compressed is in a relaxed position, where the at least one noise-making element is at least partially decompressed in an extended position, and where when the self-recovering stretchable element extends from the relaxed position to the extended position, the at least one noise-making elements emits a noise. In some embodiments, the number of attachment points form a panel attached with the toy body and forming a number of separations within the toy body.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
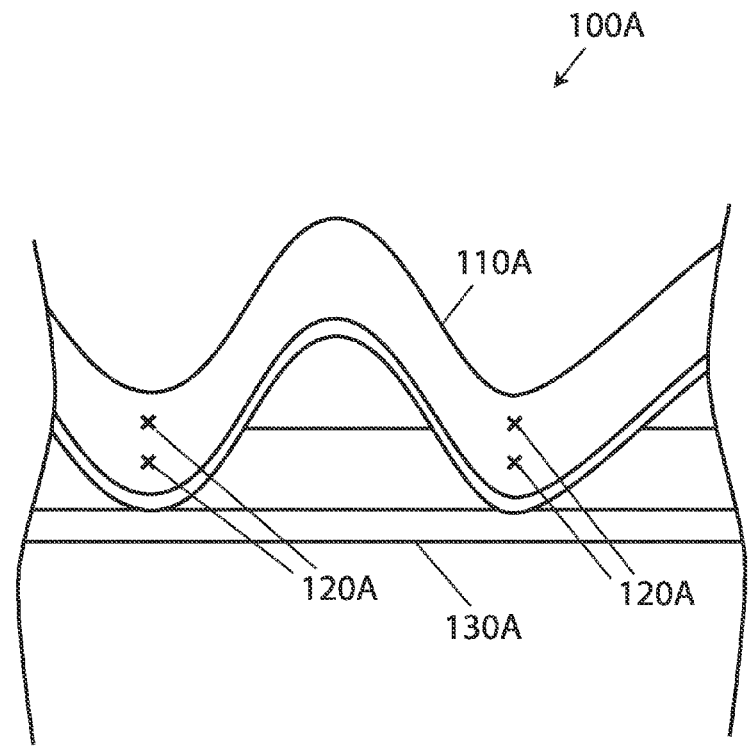
FIG. 1A is an illustrative representation of a partial view of a self-recovering noise-making assembly in a relaxed position in accordance with embodiments of the present invention.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

It may be appreciated that embodiments described herein may include many variations and configurations without departing from the present invention. However, at least one common element may be found across all embodiments, that is:

One or more noise-making element(s).

Other embodiments may also include in any combination without limitation:

One or more attachment points(s),
One or more self-recovering stretchable element(s),
One or more travel-limiting element(s),
One or more pull member element(s),
One or more wand element(s), and
One or more enclosure element(s).

In embodiments, noise-making elements may be manufactured from a single material, a composite material, a layered material, a twisted material, a laminated material, or a woven material without limitation. Materials which may be used in order to produce a crackling sound or a vibration when deformed may include plant-based paper, acetate paper, aluminum foil, polypropylene, MYLAR® (polyethylene terephthalate film) and various other polymer films without limitation. Indeed, any alternative material known in the art may be utilized in embodiments in order to produce noise or vibrations without limitation.

In further embodiments, attachment points provide a point or area of attachment between two or more elements disclosed herein. Attachment may be provided in any number of manners without departing from embodiments herein including, for example, stitching, knotting, weaving, gluing, laser welding, heat welding, ultrasonic welding, stapling and the like.

In embodiments, self-recovering stretchable elements provide an element that is deformable via physical pulling or twisting and recovers to its original shape and size when the forces causing deformation are removed. Self-recovering stretchable elements may include stretchable fabrics such as LYCRA® or SPANDEX®, elastic polymers such as plasticized rubber or elasticized plastics, a rubber compound, and semi-elastic polymer, a stretchable weave, and a spring coil.

In embodiments, travel-limiting elements provide for a limitation in movement (or stretch) in one or more directions that prevents or inhibits other elements from damaging deformation. Travel-limiting elements may include lengths of materials such as woven fabrics, ropes, plastics, rubbers and the like. Travel-limiting elements may also use structures such as knots and through-holes in order to provide for travel-limiting of attachment point embodiments.

In embodiments, pull members provide a structure whereby a dog, cat, person, or the like may pull on the self-recovering stretchable elements in one or more directions in order to produce noise or vibration. Pull member embodiments may include fabric, rope, plastic, rubber and the like without limitation.

In embodiments, enclosure elements or extendable elements provide one or more of the following: decorative functionality, protective functionality, transference of physical forces functionality, travel-limiting functionality, and recovery of affixed element(s) functionality. Each extendable element may fully or partially enclose one or more element(s) of embodiments provided herein. An extendable element may be manufactured from one or more materials such as fabric, stretchable fabric, plastic or rubber.

FIG. 1A is an illustrative representation of a partial view of a self-recovering noise-making assembly 100A in a relaxed position in accordance with embodiments of the present invention. As illustrated, noise-making assembly 100A includes noise-making element 110A mechanically coupled with and along self-recovering stretchable element 130A at a number of attachment points 120A. As may be seen noise-making element 110A forms a number of slack portions between attachment points 120A when self-recovering stretchable element 130A is in a relaxed position. It may be appreciated that in embodiments, noise-making elements may be manufactured from a variety of materials such as: a plant-based paper, an acetate paper, a metal foil, a polypropylene compound, a polyethylene terephthalate compound, and a semi-rigid polymer without limitation. In addition, in embodiments, noise-making elements may be constructed in a variety of manners such as: a single layer construction, a multi-layered construction, a twisted construction, a laminated construction, and a woven construction. Further, in embodiments, self-recovering stretchable elements may be manufactured from a variety of materials such as: a stretchable fabric, an elastic polymer, a rubber compound, and semi-elastic polymer, a stretchable weave, and a spring coil without limitation. Still further, in embodiments, attachment points may be made using a variety of processes such as: a stitching, a knotting, a weaving, a gluing, a laser welding, a heat welding, an ultrasonic welding, and a stapling.

It may be appreciated that noise-making elements may be creased, bent, folded, molded, or otherwise formed or modified such that noise-making elements deform in conjunction with extending and relaxing of self-recovering stretchable elements to which they are affixed without tearing or otherwise damaging itself or other elements. Attachment points may serve to both maintain the slack portions (or deformations) along the noise-making elements while in a relaxed position and to ensure coincident deformation of the noise-making elements as the self-recovering stretchable elements extend and relax.

Note that this and other figures provided herein illustrate partial views of embodiments and serve to show that the shape pattern associated with the noise-making element(s) in those partial views, such as waves, creases, wrapping, indentations and other patterns, may be repeated as needed throughout either a full span or a portion of an embodiment. For example, as illustrated, the wave pattern formed by the noise-making element 110A having wave troughs at the areas where attachment points 120A occur may be replicated through the length of an embodiment such that multiple repetitions of that pattern (in this case, waves) are formed. In each example, each wave or section of noise-making element may produce crackling noises when deformed by extending or relaxing of the attached self-recovering stretchable element 130A. In addition, it may be appreciated that any placement, quantity, size, shape and type of attachment points may be utilized without departing from embodiments of the invention.

Figure 1B:
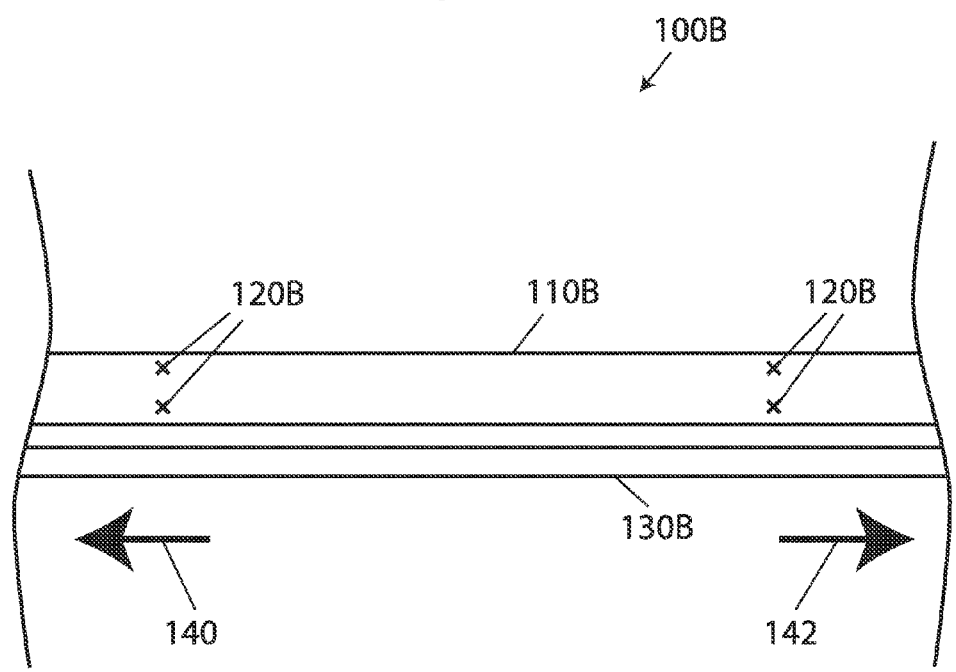
FIG. 1B is an illustrative representation of a partial view of a self-recovering noise-making assembly in an extended position in accordance with embodiments of the present invention.

FIG. 1B is an illustrative representation of a partial view of a self-recovering noise-making assembly 100B in an extended position in accordance with embodiments of the present invention. As illustrated, noise-making assembly 100B includes noise-making element 110B mechanically coupled with and along self-recovering stretchable element 130B at a number of attachment points 120B. As may be seen noise-making element 1100B is effectively stretched between attachment points 120B when self-recovering stretchable element 130B is in an extended position. Arrows 140 and 142 illustrate opposing directions of pull that have been applied to embodiments provided herein. As noise-making assembly 100B is pulled along arrows 140 and 142, noise is produced by noise-making element 110B. Likewise, as noise-making assembly 100B is relaxed, noise is produced by noise-making element 110B. It is advantageous that when noise-making assembly 100B is in a relaxed position, noise may be produced by noise-making element 110B when struck. Furthermore, embodiments provide noise-making when noise-making assembly is twisted. Thus, noise may be produced in striking, twisting, or stretching embodiments provided herein. In some embodiments, a pull member (not shown) may be attached along an end of self-recovering stretchable element 130B that may provide an easily graspable surface or structure for stretching noise-making assembly 100B.

Figure 2A:
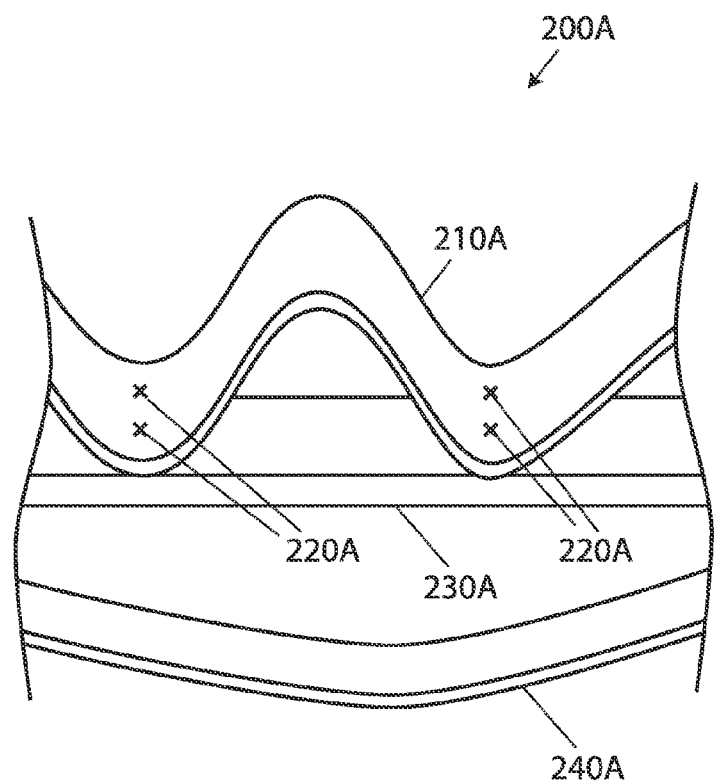
FIG. 2A is an illustrative representation of a partial view of a self-recovering noise-making assembly in a relaxed position in accordance with embodiments of the present invention.

FIG. 2A is an illustrative representation of a partial view of a self-recovering noise-making assembly 200A in a relaxed position in accordance with embodiments of the present invention. As illustrated, noise-making assembly 200A includes noise-making element 210A mechanically coupled with and along self-recovering stretchable element 230A at a number of attachment points 220A. As may be seen noise-making element 210A forms a number of slack portions between attachment points 220A when self-recovering stretchable element 230A is in a relaxed position. In addition, noise-making assembly 200A includes travel limiting element 240A. It may be appreciated that in embodiments, noise-making elements may be manufactured from a variety of materials such as: a plant-based paper, an acetate paper, a metal foil, a polypropylene compound, a polyethylene terephthalate compound, and a semi-rigid polymer without limitation. In addition, in embodiments, noise-making elements may be constructed in a variety of manners such as: a single layer construction, a multi-layered construction, a twisted construction, a laminated construction, and a woven construction. Further, in embodiments, self-recovering stretchable elements may be manufactured from a variety of materials such as: a stretchable fabric, an elastic polymer, a rubber compound, and semi-elastic polymer, a stretchable weave, and a spring coil without limitation. Still further, in embodiments, attachment points may be made using a variety of processes such as: a stitching, a knotting, a weaving, a gluing, a laser welding, a heat welding, an ultrasonic welding, and a stapling. Further, in embodiments, travel limiting elements may be manufactured from a variety of materials such as: cottons, polyesters, wools, hemp, other natural fibers, other synthetic fibers, rubber, plastic or elastomers.

It may be appreciated that noise-making elements may be creased, bent, folded, molded, or otherwise formed or modified such that noise-making elements deform in conjunction with extending and relaxing of self-recovering stretchable elements to which they are affixed without tearing or otherwise damaging itself or other elements. Attachment points may serve to both maintain the slack portions (or deformations) along the noise-making elements while in a relaxed position and to ensure coincident deformation of the noise-making elements as the self-recovering stretchable elements extend and relax.

Note that this and other figures provided herein illustrate partial views of embodiments and serve to show that the shape pattern associated with the noise-making element(s) in those partial views, such as waves, creases, wrapping, indentations and other patterns, may be repeated as needed throughout either a full span or a portion of an embodiment. For example, as illustrated, the wave pattern formed by the noise-making element 210A having wave troughs at the areas where attachment points 220A occur may be replicated through the length of an embodiment such that multiple repetitions of that pattern (in this case, waves) are formed. In each example, each wave or section of noise-making element may produce crackling noises when deformed by extending or relaxing of the attached self-recovering stretchable element 230A. In addition, it may be appreciated that any placement, quantity, size, shape and type of attachment points may be utilized without departing from embodiments of the invention. In addition, travel limiting element 240A may be attached along each end of self-recovering stretchable element 230A to limit the extended position of the self-recovering stretchable element. Travel limiting element embodiments are generally flexible and non-stretching.

Figure 2B:
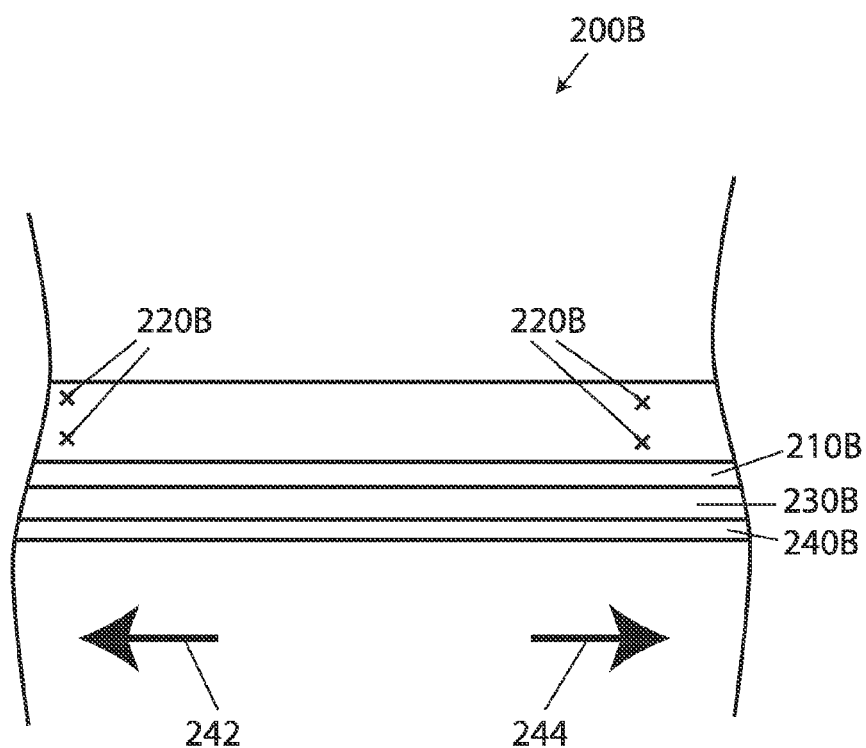
FIG. 2B is an illustrative representation of a partial view of a self-recovering noise-making assembly in an extended position in accordance with embodiments of the present invention.

FIG. 2B is an illustrative representation of a partial view of a self-recovering noise-making assembly 200B in an extended position in accordance with embodiments of the present invention. As illustrated, noise-making assembly 200B includes noise-making element 210B mechanically coupled with and along self-recovering stretchable element 230B at a number of attachment points 220B. As may be seen noise-making element 210B is effectively stretched between attachment points 220B when self-recovering stretchable element 230B is in an extended position. Arrows 242 and 244 illustrate opposing directions of pull that have been applied to embodiments provided herein. As noise-making assembly 200B is pulled along arrows 242 and 244, noise is produced by noise-making element 210B. Likewise, when noise-making assembly 200B is relaxed, noise is produced by noise-making element 210B. Additionally, it may be seen that travel-limiting element 240B has served to limit the extended position of self-recovering stretchable element 230B and corresponding attached elements. While in the illustrated figure, noise-making element 210B is fully extended, in some embodiments, noise-making elements may not be fully extended and remain partially relaxed. It is advantageous that when noise-making assembly 200B is in a relaxed position, noise may be produced by noise-making element 210B when struck. Furthermore, embodiments provide noise-making when noise-making assembly is twisted. Thus, noise may be produced in striking, twisting, or stretching embodiments provided herein. In some embodiments, a pull member (not shown) may be attached along an end of self-recovering stretchable element 230B that may provide an easily graspable surface or structure for stretching noise-making assembly 200B.

Figure 3:
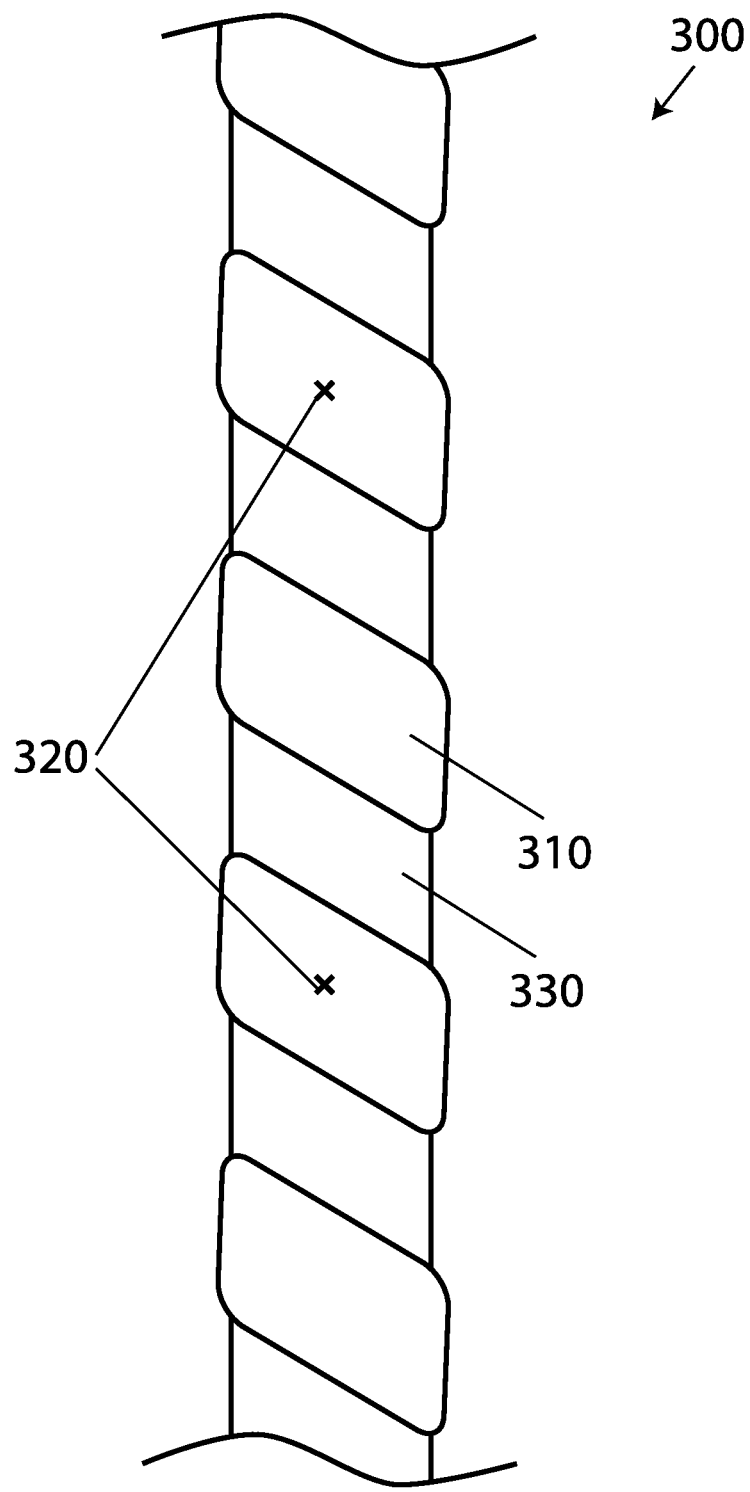
FIG. 3 is an illustrative representation of a partial view of a self-recovering noise-making assembly in a relaxed position in accordance with embodiments of the present invention.

FIG. 3 is an illustrative representation of a partial view of a self-recovering noise-making assembly 300 in a relaxed position in accordance with embodiments of the present invention. As illustrated, noise-making element 310 may be spirally wrapped around self-recovering stretchable element 330 and mechanically coupled thereto at attachment points 320. In some embodiments, a travel limiting elements may be a woven "shell" that may cover an elastomeric core. By way of example, a "bungee cord", having a elastomeric core and a woven outer shell which serves to protect the elastomeric core from abrasion and from breakage due to excessive pull forces may be utilized in embodiments. Other embodiments may be configured utilizing no travel limiting element. As may be appreciated, noise-producing element 310 forms a spiral that elongates longitudinally and diminishes in radius cross-sectionally as pull forces are presented to self-recovering noise-making assembly, thus causing deformation and associated noise and vibration production by noise-making element 310. It may be appreciated that in embodiments, noise-making elements may be manufactured from a variety of materials such as: a plant-based paper, an acetate paper, a metal foil, a polypropylene compound, a polyethylene terephthalate compound, and a semi-rigid polymer without limitation. In addition, in embodiments, noise-making elements may be constructed in a variety of manners such as: a single layer construction, a multi-layered construction, a twisted construction, a laminated construction, and a woven construction. Further, in embodiments, self-recovering stretchable elements may be manufactured from a variety of materials such as: a stretchable fabric, an elastic polymer, a rubber compound, and semi-elastic polymer, a stretchable weave, and a spring coil without limitation. Still further, in embodiments, attachment points may be made using a variety of processes such as: a stitching, a knotting, a weaving, a gluing, a laser welding, a heat welding, an ultrasonic welding, and a stapling. Further, in embodiments, travel limiting elements may be manufactured from a variety of materials such as: cottons, polyesters, wools, hemp, other natural fibers, other synthetic fibers, rubber, plastic or elastomers.

Figure 4:
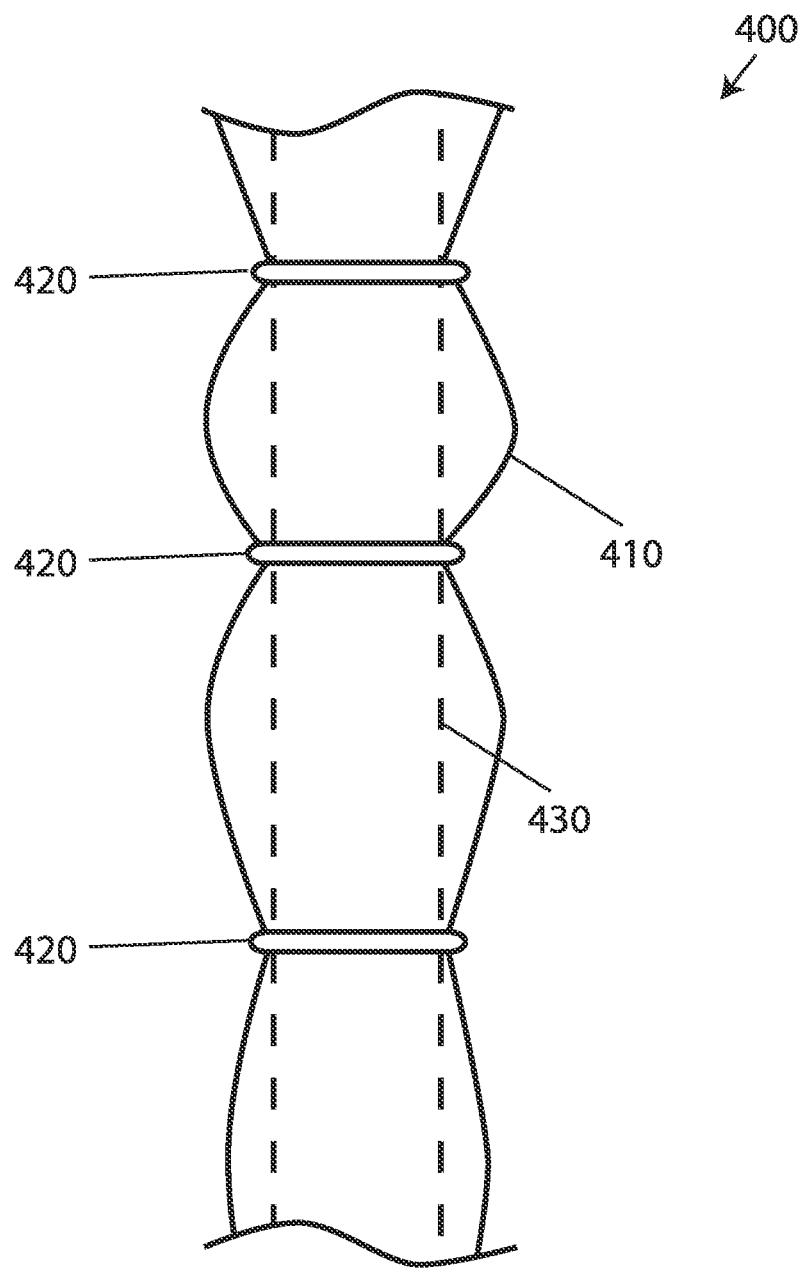
FIG. 4 is an illustrative representation of a partial view of a self-recovering noise-making assembly in a relaxed position in accordance with embodiments of the present invention.

FIG. 4 is an illustrative representation of a partial view of a self-recovering noise-making assembly 400 in a relaxed position in accordance with embodiments of the present invention. As illustrated, self-recovering noise-making assembly 400 includes a central core of elastomeric material that serves as self-recovering stretchable element 430. An example embodiment of the tubular structure referenced and depicted herein is a "bungee cord", having a elastomeric core and a woven outer shell which serves to protect the elastomeric core from abrasion and from breakage due to excessive pull forces. Other embodiments may be configured utilizing no travel limiting element. Ring-shaped attachment points 420 are provided at various points or areas such that pleated or wavy tubular formed noise-making element 410 is able to deform in conjunction with the self-recovering stretchable element 430 and the self-recovering stretchable element (not shown). Notably, noise-making element 410 may elongate longitudinally and becomes more conformal with the contained or mostly contained and affixed travel limiting element 440 as pull forces are presented to the embodiment illustrated. The pleats, bunching, or other manner of loosening of the noise-making element 410 between attachment points 420 are appropriately sized such that the mechanically coupled self-recovering stretchable element 430 impedes or restricts travel past the point where noise-making element 410 becomes taut, thus ensuring that the affixed invention elements are not damaged.

It is noted that a combination of the forms of the noise-making elements depicted in FIGS. 3 and 4 also provide for additional noise-making configurations in accordance with embodiments of the present invention. For example, if the tubular or mostly tubular shaped or formed noise-making element 410 of FIG. 4 were to be twisted and optionally bunched, pleated or otherwise loosened between the affixation elements 420 prior to affixation, the resultant noise-making element 410 would be both spirally fashioned around the travel-limiting element 440 as well as containing or mostly containing the travel-limiting element 440 in a tubular or mostly tubular fashion. It is further noted that that the tubular or mostly tubular structure comprising either or both of the travel-limiting element 440 and the self-recovering stretchable element (not shown) illustrated in FIG. 4 as well as in any embodiment of the invention may have any number of cross-sectional profiles such as: circular, square, rectangular, and elliptical. Conversely, it is further noted that the planar or mostly planar shaped elements depicted in other figures herein and/or discussed herein and in any embodiment of the invention may be substituted by elements having a different cross-sectional profile.

Figure 5:
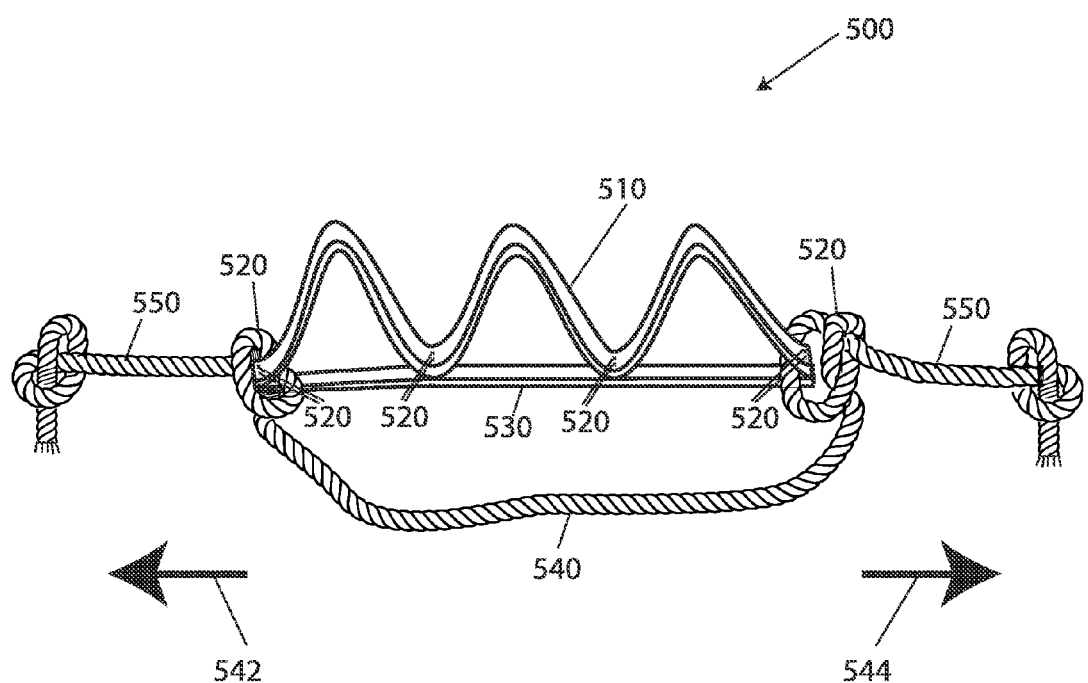
FIG. 5 is an illustrative representation of a self-recovering noise-making assembly in accordance with embodiments of the present invention.

FIG. 5 is an illustrative representation of a partial view of a self-recovering noise-making assembly 500 in a relaxed position in accordance with embodiments of the present invention. As illustrated, noise-making assembly 500 includes noise-making element 510 mechanically coupled with and along self-recovering stretchable element 530 at a number of attachment points 520. As may be seen noise-making element 510 forms a number of slack portions between attachment points 520 when self-recovering stretchable element 530 is in a relaxed position. In addition, noise-making assembly 500 includes travel limiting element 540. Arrows 542 and 544 illustrate opposing directions of pull that may be applied to embodiments provided herein. As noise-making assembly 500 is pulled along arrows 542 and 544, noise is produced by noise-making element 510. Likewise, as noise-making assembly 500 is relaxed, noise is produced by noise-making element 510. It is advantageous that when noise-making assembly 500 is in a relaxed position, noise may be produced by noise-making element 510 when struck. Furthermore, embodiments provide noise-making when noise-making assembly is twisted. Thus, noise may be produced in striking, twisting, or stretching embodiments provided herein. In some embodiments, pull members 550 may be attached along each end of self-recovering stretchable element 530 to provide an easily graspable surface or structure for stretching noise-making assembly 500.

It may be appreciated that in embodiments, noise-making elements may be manufactured from a variety of materials such as: a plant-based paper, an acetate paper, a metal foil, a polypropylene compound, a polyethylene terephthalate compound, and a semi-rigid polymer without limitation. In addition, in embodiments, noise-making elements may be constructed in a variety of manners such as: a single layer construction, a multi-layered construction, a twisted construction, a laminated construction, and a woven construction. Further, in embodiments, self-recovering stretchable elements may be manufactured from a variety of materials such as: a stretchable fabric, an elastic polymer, a rubber compound, and semi-elastic polymer, a stretchable weave, and a spring coil without limitation. Still further, in embodiments, attachment points may be made using a variety of processes such as: a stitching, a knotting, a weaving, a gluing, a laser welding, a heat welding, an ultrasonic welding, and a stapling. Further, in embodiments, travel limiting elements may be manufactured from a variety of materials such as: cottons, polyesters, wools, hemp, other natural fibers, other synthetic fibers, rubber, plastic or elastomers.

It may be appreciated that noise-making elements may be creased, bent, folded, molded, or otherwise formed or modified such that noise-making elements deform in conjunction with extending and relaxing of self-recovering stretchable elements to which they are affixed without tearing or otherwise damaging itself or other elements. Attachment points may serve to both maintain the slack portions (or deformations) along the noise-making elements while in a relaxed position and to ensure coincident deformation of the noise-making elements as the self-recovering stretchable elements extend and relax.

Note that this and other figures provided herein illustrate partial views of embodiments and serve to show that the shape pattern associated with the noise-making element(s) in those partial views, such as waves, creases, wrapping, indentations and other patterns, may be repeated as needed throughout either a full span or a portion of an embodiment. For example, as illustrated, the wave pattern formed by the noise-making element 510 having wave troughs at the areas where attachment points 520 occur may be replicated through the length of an embodiment such that multiple repetitions of that pattern (in this case, waves) are formed. In each example, each wave or section of noise-making element may produce crackling noises when deformed by extending or relaxing of the attached self-recovering stretchable element 530. In addition, it may be appreciated that any placement, quantity, size, shape and type of attachment points may be utilized without departing from embodiments of the invention. In addition, travel limiting element 540 may be attached along each end of self-recovering stretchable element 530 to limit the extended position of the self-recovering stretchable element. Travel limiting element embodiments are generally flexible and non-stretching.

Figure 6:
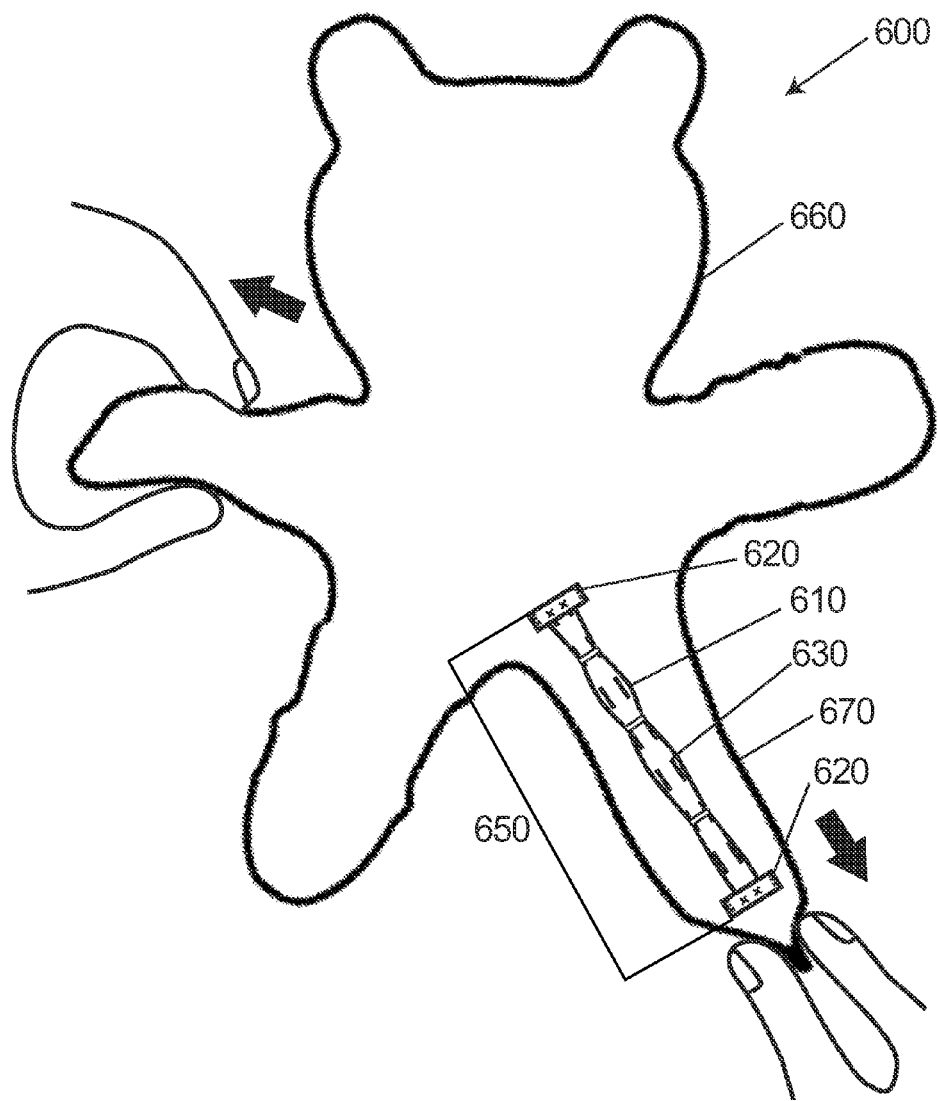
FIG. 6 is an illustrative representation of a noise-making toy in accordance with embodiments of the present invention.

FIG. 6 is an illustrative representation of a noise-making toy 600 in accordance with embodiments of the present invention. As illustrated, plush toy 660 may be utilized in combination with self-recovering noise-making assembly 650. In particular, noise-making assembly 650 substantially corresponds with embodiments described for FIG. 4. As above, self-recovering noise-making assembly 650 includes a central core of elastomeric material that serves as self-recovering stretchable element 630. Further illustrated is noise-making element 610 that may produce noise upon deformation. Self-recovering noise-making assembly 650 may be enclosed within extendable element 670 that, in the illustrated example is the leg of a teddy bear and may be mechanically coupled along both ends of extendable element 670 at connection points 620.

As illustrated, when the lower right and upper left toy's legs are pulled, the enclosure 660 (and therefore extendable element 670) is stretched between the pull forces, whereupon the connection points 620 cause self-recovering noise-making assembly 650 to extend, thus making noise. So that materials comprising plush toy 660 do not impede the pull initiated travel of the internal elements, plush materials may: be "bunched up," or partially compressed prior to affixation at the endpoints of the internal elements, be pleated and/or be constructed of a stretchable material, such as LYCRA®. In embodiments, a covering material having elastic properties may be utilized for plush toy 660 and may also serve as a self-recovering stretchable element. To the extent that plush toy 660 provides additional resistance against pull forces damaging embodiments, the enclosure may also serve as a travel limiting element.

It may be appreciated that more than one portion of plush toy 660 may contain additional self-recovering noise-making assemblies in order to enable pull-induced noisemaking within that portion of the enclosure. It may be noted that that a single internal structure, such as that depicted in the lower right leg of the enclosure of FIG. 6 may traverse from one end of the enclosure to the other. For example, a single internal structure may be affixed between the lower right leg to the upper left arm in FIG. 6 in embodiments. In addition, connection points 620 in addition to those used at the endpoints of the self-recovering noise-making assembly may be used in order to further affix the enclosure 660 at various points along the internal invention elements. It may be appreciated that in embodiments, noise-making elements may be manufactured from a variety of materials such as: a plant-based paper, an acetate paper, a metal foil, a polypropylene compound, a polyethylene terephthalate compound, and a semi-rigid polymer without limitation. In addition, in embodiments, noise-making elements may be constructed in a variety of manners such as: a single layer construction, a multi-layered construction, a twisted construction, a laminated construction, and a woven construction. Further, in embodiments, self-recovering stretchable elements may be manufactured from a variety of materials such as: a stretchable fabric, an elastic polymer, a rubber compound, and semi-elastic polymer, a stretchable weave, and a spring coil without limitation. Still further, in embodiments, attachment points may be made using a variety of processes such as: a stitching, a knotting, a weaving, a gluing, a laser welding, a heat welding, an ultrasonic welding, and a stapling. Further, in embodiments, travel limiting elements may be manufactured from a variety of materials such as: cottons, polyesters, wools, hemp, other natural fibers, other synthetic fibers, rubber, plastic or elastomers.

Figure 7:
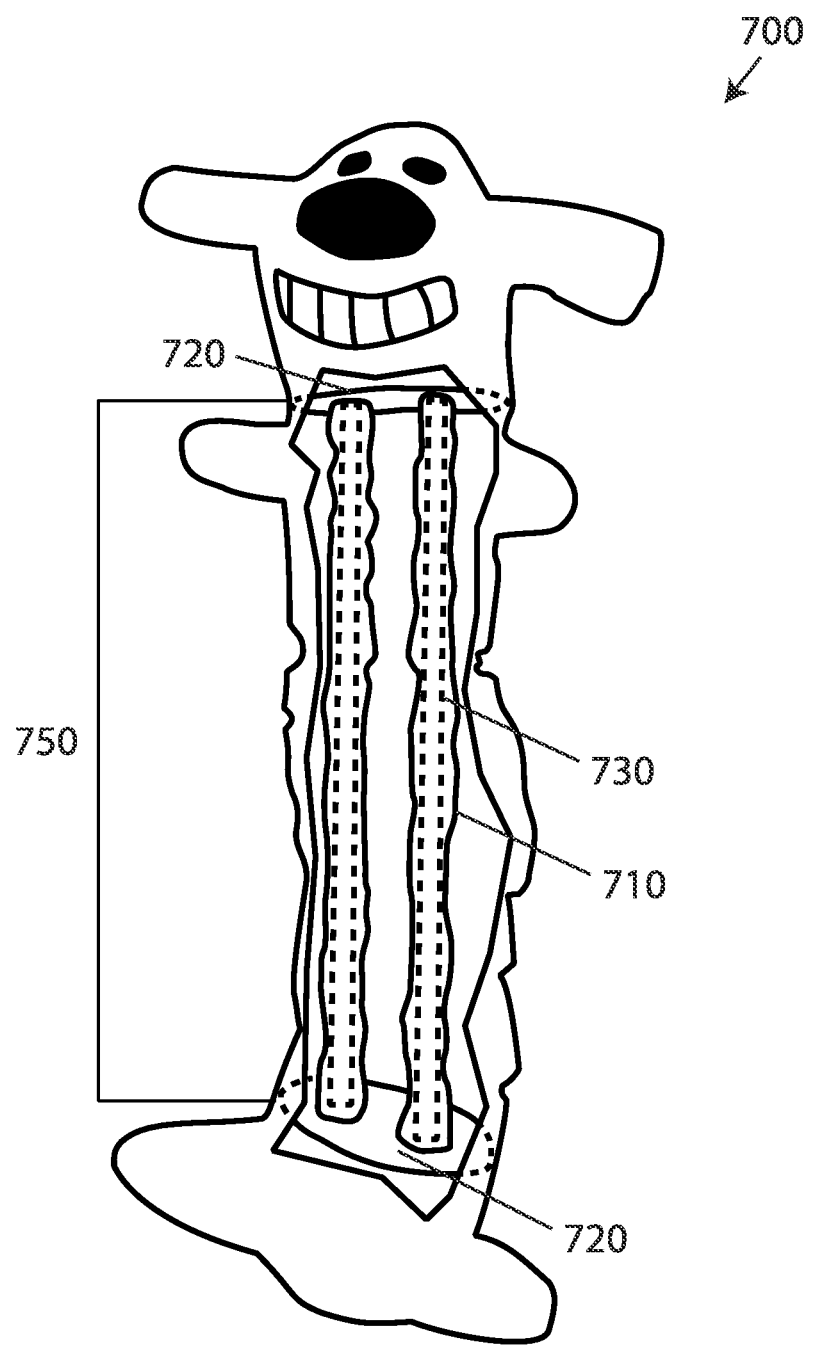
FIG. 7 is an illustrative representation of a noise-making toy in accordance with embodiments of the present invention.

FIG. 7 is an illustrative representation of noise-making toy 700 in accordance with embodiments of the present invention. As illustrated, plush toy 700 may be utilized in combination with self-recovering noise-making assembly 750. In particular, noise-making assembly 750 approximately corresponds with embodiments described for FIG. 4. As above, self-recovering noise-making assembly 750 includes a central core of elastomeric material that serves as self-recovering stretchable element 730. Further illustrated is noise-making element 710 that may produce noise upon deformation. In embodiments, self-recovering stretchable element 730 may be enclosed within noise-making element 710. In further embodiments noise-making elements may be a tubular configuration that partially or fully surrounds self-recovering stretchable elements. As may be appreciated, noise-making element 710 may be at least partially compressed when in a relaxed position and at least partially decompressed in an extended position. In operation, when self-recovering stretchable element 730 extends from a relaxed position to an extended position, noise-making element 710 emits a noise.

Further illustrated are attachment points 720 for mechanically coupling noise-making assembly 750 with the body of plush toy 700. In some embodiments, such as illustrated, attachment points may form a panel that forms separations within the body of plush toy 700. Separations may be useful for providing physically separated compartments for other noise-making assemblies or stuffing. It may be appreciated that the body of plush toy embodiments may be manufactured from any stretchable fabric or material known in the art without limitation. Further, in embodiments, noise-making elements may be manufactured from a variety of materials such as: a plant-based paper, an acetate paper, a metal foil, a polypropylene compound, a polyethylene terephthalate compound, and a semi-rigid polymer without limitation. Still further, as illustrated, two noise-making assemblies are utilized. However, any number of noise-making assemblies may be utilized without departing from embodiments provided herein.

Figure 8:
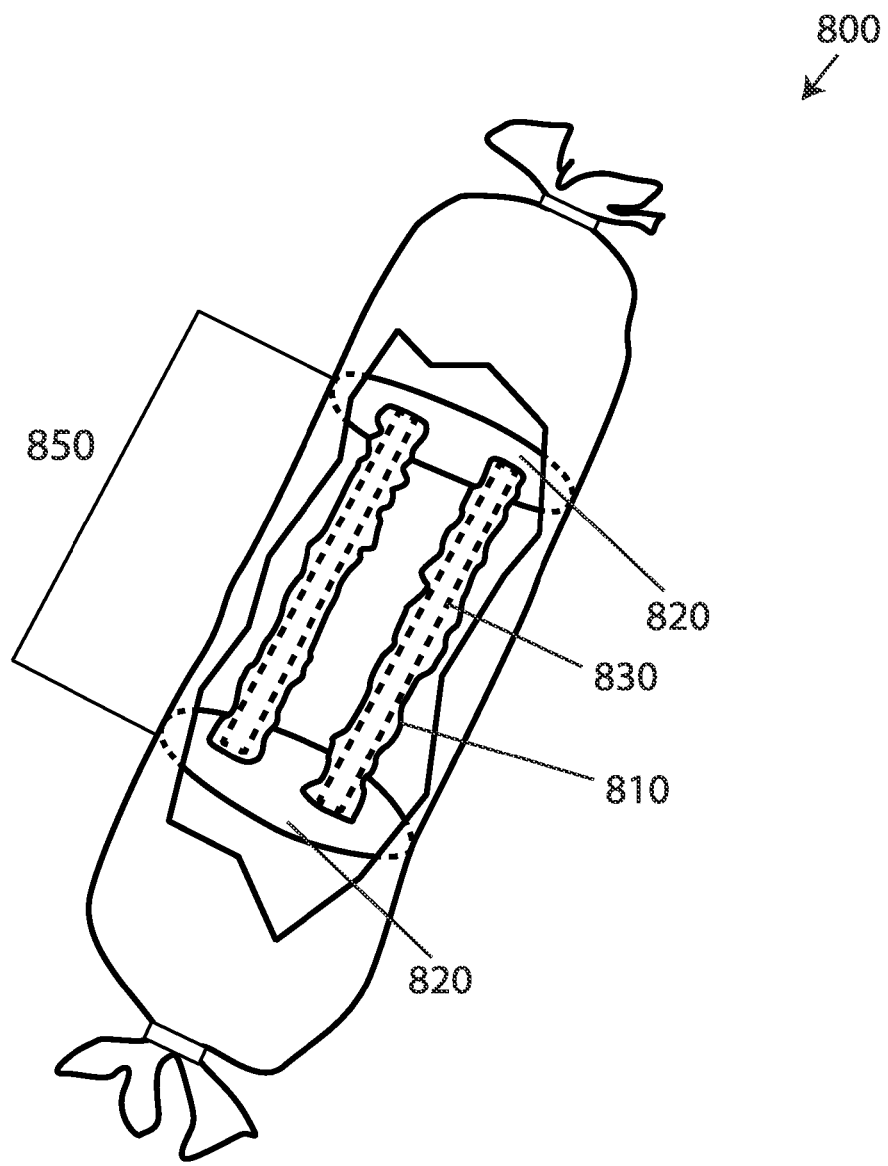
FIG. 8 is an illustrative representation of a noise-making toy in accordance with embodiments of the present invention.

FIG. 8 is an illustrative representation of a noise-making toy in accordance with embodiments of the present invention. As illustrated, plush toy 800 may be utilized in combination with self-recovering noise-making assembly 850. In particular, noise-making assembly 850 approximately corresponds with embodiments described for FIG. 4. As above, self-recovering noise-making assembly 850 includes a central core of elastomeric material that serves as self-recovering stretchable element 830. Further illustrated is noise-making element 810 that may produce noise upon deformation. In embodiments, self-recovering stretchable element 830 may be enclosed within noise-making element 810. In further embodiments noise-making elements may be a tubular configuration that partially or fully surrounds self-recovering stretchable elements. As may be appreciated, noise-making element 810 may be at least partially compressed when in a relaxed position and at least partially decompressed in an extended position. In operation, when self-recovering stretchable element 830 extends from a relaxed position to an extended position, noise-making element 810 emits a noise.

Further illustrated are attachment points 820 for mechanically coupling noise-making assembly 850 with the body of plush toy 800. In some embodiments, such as illustrated, attachment points may form a panel that forms separations within the body of plush toy 800. Separations may be useful for providing physically separated compartments for other noise-making assemblies or stuffing. It may be appreciated that the body of plush toy embodiments may be manufactured from any stretchable fabric or material known in the art without limitation. Further, in embodiments, noise-making elements may be manufactured from a variety of materials such as: a plant-based paper, an acetate paper, a metal foil, a polypropylene compound, a polyethylene terephthalate compound, and a semi-rigid polymer without limitation. Still further, as illustrated, two noise-making assemblies are utilized. However, any number of noise-making assemblies may be utilized without departing from embodiments provided herein.

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A noise-making assembly comprising:
a self-recovering stretchable element; and
at least one noise-making element mechanically coupled with and along the self-recovering stretchable element at a plurality of attachment points, wherein
the at least one noise-making element forms slack portions between the plurality of attachment points when the self-recovering stretchable element is in a relaxed position, wherein
the slack portions are flattened when the self-recovering stretchable element is in an extended position, wherein
when the self-recovering stretchable element extends from the relaxed position to the extended position, the at least one noise-making element emits a noise during deformation of the at least one noise-making element, and wherein
when the self-recovering stretchable element retracts from the extended position to the relaxed position, the at least one noise-making element emits a noise during deformation of the at least one noise-making element.

2. The noise-making assembly of claim 1 further comprising at least one travel limiting element attached along each end of the self-recovering stretchable element for limiting the extended position of the self-recovering stretchable element.

3. The noise-making assembly of claim 1, wherein the at least one noise-making element is manufactured from a material selected from the group consisting of: a plant-based paper, an acetate paper, a metal foil, a polypropylene compound, a polyethylene terephthalate compound, and a semi-rigid polymer.

4. The noise-making assembly of claim 3, wherein the at least one noise-making element is constructed in a manner selected from the group consisting of: a single layer construction, a multi-layered construction, a twisted construction, a laminated construction, and a woven construction.

5. The noise-making assembly of claim 1, wherein the self-recovering stretchable element is manufactured from a material selected from the group consisting of: a stretchable fabric, an elastic polymer, a rubber compound, and semi-elastic polymer, a stretchable weave, and a spring coil.

6. The noise-making assembly of claim 1, wherein the plurality of attachment points are made using a process selected from the group consisting of: a stitching, a knotting, a weaving, a gluing, a laser welding, a heat welding, an ultrasonic welding, and a stapling.

7. The noise-making assembly of claim 1, further comprising:
at least one pull member attached along an end of the self-recovering stretchable element.

8. A noise-making toy comprising:
a toy body;
at least one extendable element connected with the toy body; and
at least one noise-making assembly enclosed within the at least one extendable element, wherein the at least one noise-making assembly comprises,
a self-recovering stretchable element attached along one end of the at least one extendable element and the toy body, and at least one noise-making element mechanically coupled with and along the self-recovering stretchable element at a plurality of attachment points, wherein the at least one noise-making element forms slack portions between the plurality of attachment points when the self-recovering stretchable element is in a relaxed position, wherein the slack portions are flattened when the self-recovering stretchable element is in an extended position, wherein when the self-recovering stretchable element extends from the relaxed position to the extended position, the at least one noise-making element emits a noise during deformation of the at least one noise-making element, and wherein when the self-recovering stretchable element retracts from the extended position to the relaxed position, the at least one noise-making element emits a noise during deformation of the at least one noise-making element.

9. The noise-making toy of claim 8 further comprising at least one travel limiting element attached along each end of the self-recovering stretchable element for limiting the extended position of the self-recovering stretchable element.

10. The noise-making toy of claim 8, wherein the at least one noise-making element is manufactured from a material selected from the group consisting of: a plant-based paper, an acetate paper, a metal foil, a polypropylene compound, a polyethylene terephthalate compound, and a semi-rigid polymer.

11. The noise-making toy of claim 8, wherein the at least one noise-making element is constructed in a manner selected from the group consisting of: a single layer construction, a multi-layered construction, a twisted construction, a laminated construction, and a woven construction.

12. The noise-making toy of claim 8, wherein the self-recovering stretchable element is manufactured from a material selected from the group consisting of: a stretchable fabric, an elastic polymer, a rubber compound, and semi-elastic polymer, a stretchable weave, and a spring coil.

13. The noise-making toy of claim 8, wherein the plurality of attachment points are made using a process selected from the group consisting of: a stitching, a knotting, a weaving, a gluing, a laser welding, a heat welding, an ultrasonic welding, and a stapling.

14. The noise-making toy of claim 8, wherein the at least one extendable element further comprises:
at least one pull member attached along a distal end of the at least one extendable element.

15. A noise-making toy comprising:
a toy body; and
at least one noise-making assembly enclosed within the toy body, wherein the at least one noise-making assembly comprises,
a self-recovering stretchable element, and
at least one noise-making element mechanically coupled with the self-recovering stretchable element at a plurality of attachment points, wherein the at least one noise-making element is a tubular configuration that surrounds the self-recovering stretchable element, wherein the at least one noise-making element is at least partially compressed is in a relaxed position, wherein the at least one noise-making element is at least partially decompressed in an extended position, wherein when the self-recovering stretchable element extends from the relaxed position to the extended position, the at least one noise-making element emits a noise during deformation of the at least one noise-making element, and wherein when the self-recovering stretchable element retracts from the extended position to the relaxed position, the at least one noise-making element emits a noise during deformation of the at least one noise-making element.

16. The noise-making toy of claim 15, wherein the plurality of attachment points form a panel attached with the toy body and forming a plurality of separations within the toy body.

17. The noise-making toy of claim 15, wherein the at least one noise-making element is manufactured from a material selected from the group consisting of: a plant-based paper, an acetate paper, a metal foil, a polypropylene compound, a polyethylene terephthalate compound, and a semi-rigid polymer.

18. The noise-making toy of claim 15, wherein the toy body is manufactured from a stretchable fabric.

* * * * *